United States Patent
Rao

[11] Patent Number: 6,004,481
[45] Date of Patent: Dec. 21, 1999

[54] SMALL PARTICLE TERBIUM ACTIVATED YTTRIUM GADOLINIUM BORATE PHOSPHORS AND METHOD OF MAKING

[75] Inventor: Ravilisetty P. Rao, Highland, N.Y.

[73] Assignee: Matsushita Electric Industrial Co., Ltd., Japan

[21] Appl. No.: 09/049,349

[22] Filed: Mar. 27, 1998

[51] Int. Cl.$^6$ .............................. C09K 11/63; C09K 11/78
[52] U.S. Cl. .................................................. 252/301.4 R
[58] Field of Search ...................................... 252/301.4 R

[56] References Cited

FOREIGN PATENT DOCUMENTS 7-3261   1/1995   Japan .

*Primary Examiner*—C. Melissa Koslow
*Attorney, Agent, or Firm*—Ohlandt, Greeley, Ruggiero & Perle

[57] ABSTRACT

Small particle yttrium, gadolinium, terbium and cerium borate phosphors are produced by thermal decomposition of gels or solutions or powders containing yttrium, gadolinium, terbium and cerium salts and an organic precursor such as trimethyl borate or boric acid at a temperature below the normal temperature of solid state reaction. The phosphor of the present invention has the empirical formula:

$$(Y_{1-x-y-z}Gd_xTb_yCe_z)BO_3$$

wherein: $0.0 \leq x \leq 0.2$, $0.01 \leq y \leq 0.1$, and $0.0 \leq z \leq 0.1$.

16 Claims, 9 Drawing Sheets

TGA OF SAMPLE 15; WT LOSS TEMP VS TEMP 4.89MG

SMALL PARTICLE TERBIUM ACTIVATED YTTRIUM GADOLINIUM BORATE PHOSPHORS AND METHOD OF MAKING

FIELD OF THE INVENTION

This invention relates to improved yttrium borate and yttrium gadolinium borate phosphor particles doped with terbium as an activator and optionally, with cerium as a sensitizer, and a method for forming such particles. More specifically, this invention relates to novel phosphor particles and method of forming such particles from oxides, nitrates, hydroxides and organic precursors, which method forms small particles that provide the improved performance (higher brightness, shorter persistence, better stability, longer life time and good color saturation) required for flat panel display (FPD) and lamp applications.

BACKGROUND OF THE INVENTION

Plasma display panels (PDP), as used in high definition televisions (HDTV) and projection television (PTV) applications, conventionally use manganese activated zinc silicate phosphor as a green emitting component due to its availability and high quantum efficiency. However, compared with red and blue emitting phosphors, zinc silicate exhibits a wide spectrum of emission with low color purity, long persistence and fast saturation with vacuum ultra violet (VUV) flux. Therefore, many efforts have been made to develop a phosphor that provides improved performance characteristics and can be used to replace Mn activated zinc silicate.

In addition, the red phosphor, green phosphor and blue phosphor currently used in PDP's have different physical characteristics and each requires a different phosphor paste rheology and screening process. Also, after screening, these phosphors exhibit different optical and electrical characteristics. These different characteristics affect the design and performance of the display. Therefore, to provide for compatible physical characteristics, it would be advantageous to form all three phosphors from a common host material that exhibits suitable red, green and blue emission under Xenon plasma excitation.

HDTV and similar types of display devices should have high resolution and high brightness for better performance. This can be achieved only with thin phosphor screens formed with very small phosphor particles (1–2 microns) in a close rib structure. Screens with small particles have a higher packing density and also require a lower binder content. HDTV and other such devices also require phosphors to display short persistence (between 5 and 10 ms) in order to prevent the formation of ghost images. It is known that lanthanide borates provide high quantum efficiency, good stability at operating temperatures and long life time with various activators, coactivators and sensitizers, particularly under VUV excitation. However, very limited information is available on the preparation and luminescence of lanthanide borates, and particularly, rare earth (RE) activated yttrium borate and yttrium gadolinium borate phosphors.

SUMMARY OF THE INVENTION

Accordingly, it is an object of the present invention to provide a $Tb^{3+}$ activated yttrium borate and yttrium gadolinium borate phosphors, optionally sensitized by doping with cerium in the form of $Ce^{3+}$; the phosphors having the empirical formula:

$$(Y_{1-x-y-z}Gd_xTb_yCe_z)BO_3$$

wherein: $0.0 \leq x \leq 0.2$; $0.01 \leq y \leq 0.1$; and $0.0 \leq z \leq 0.1$.

It is also an object of the present invention to provide a method of forming such phosphors, which method provides the phosphor in the form of a powder that has a small particle size and displays improved brightness.

The phosphors of the present invention can be synthesized using any of three different processes, specifically, a solid state reaction, a solution process and a sol-gel process. The preferred process will depend on the required particle size distribution. The sol-gel process provides very fine particles (0.1 to 2 microns). The solution process forms fine particles (1 to 4 microns); and the solid state reaction results in conventional particle sizes (2 to 6 microns). In the case of the solution process, low molar concentration solutions of salts of the respective elements are mixed and subjected to reflux in an acid medium. Very fine powders result from the slow drying of such solutions. In all cases, it is preferable that the powders contain uniform, substantially spherical particles.

Sols are dispersions of colloidal particles in a liquid. The gravitational forces on the particles are negligible. From a sol, a gel is formed with an interconnected, rigid network, having sub-micrometer pores and a polymeric chain having an average length on the order of microns. The particle size of the finished product is a function of the initial concentration of the starting sols, the gelation process, the manner in which the gels are dried, calcination temperature and the rate of cooling.

The sol-gel and solution processes offer many advantages over conventional methods in the synthesis of fine powders and particularly in the synthesis of fine phosphor powders. Since all of the starting materials are mixed at the molecular level in a solution, a high degree of homogeneity is achievable. Doping of impurities (activators/coactivators/sensitizers) through solutions is straightforward, easy and effective. The pores in properly dried gels are often extremely small and the components of a homogenous gel are intimately mixed. The surface area of powders produced from sol-gel is very high, allowing for the use of lower processing temperatures.

Phosphor materials are extremely sensitive to impurities; even in ppb levels. The low-temperatures of the solution process and sol-gel process minimize the potential for cross contamination. Some of the unwanted impurities left in the materials from conventional methods may pose a threat to the performance of a phosphor. For example, fluoride from a flux ($MgF_2$) can attack the glass surface of the display during operation. As the size of the phosphor particle decreases, the probability of electron and hole capture due to the presence of impurities increases and the electron/hole localization enhances the recombination rate via the impurity. The optimum impurity concentration (activator) level can be further increased with small particle size.

The present invention is related to the growth of $Tb^{3+}$ and optionally $Ce^{3+}$ doped yttrium borate and yttrium, gadolinium borate phosphors by sol-gel, solution and solid state processes. More specifically, the present invention provides a process for forming a $Tb^{3+}$ and $Ce^{3+}$ doped yttrium borate or yttrium, gadolinium borate phosphor having the empirical formula:

$$(Y_{1-x-y-z}Gd_xTb_yCe_z)BO_3$$

wherein: $0.0 \leq x \leq 0.2$; $0.01 \leq y \leq 0.1$; and $0.0 \leq z \leq 0.1$; which method includes the steps of:

(1) reacting a dilute solution comprising a source of yttrium, optionally a source of gadolinium, a source of terbium, optionally a source of cerium and an organic precursor providing a source of boron, in an acid medium to form a sol and/or a gel; and (2) thermally decomposing the powders obtained from the above, at a temperature below a solid state reaction temperature; or (3) mixing powdered sources of yttrium, optionally gadolinium, terbium, optionally cerium and an organic precursor providing a source of boron to form a mixed powder; and (4) firing the mixed powder at a temperature equal to or greater than the solid state reaction temperature.

BRIEF DESCRIPTION OF THE DRAWINGS

FIG. 2 shows X-ray diffraction pattern of (a) Tb and (b) Tb and Ce doped Y, Gd borate phosphor.

FIG. 3 illustrates scanning electron micrographs of Tb and Ce doped Y, Gd borate phosphors prepared from (a) (b) RE hydroxides; (c) RE nitrates; and (d) RE oxides.

FIG. 4 graphs the particle size distribution of Tb, Ce doped Y, Gd borate phosphors prepared from (a) RE hydroxides, (b) RE nitrates and (c) RE oxides.

FIG. 5 provides spectral distribution of radiation energy from Xe lamps with $MgF_2$ windows and suitable band pass filters at wavelengths of (a) 147 nm and (b) 173 nm.

FIG. 6 shows emission spectra of Tb, Ce doped Y, Gd borate of present invention and Mn activated zinc silicate (best commercial) phosphors at 147 nm excitation, recorded at room temperature (A) without and (B) with an optical filter.

FIG. 7 shows persistence (afterglow decay) of (a) Tb, and (b) Tb, Ce doped Y, Gd borate phosphors, recorded at room temperature.

DETAILED DESCRIPTION OF THE INVENTION

There are a number of display applications where a green phosphor with high brightness, shorter persistence, color purity (saturation), better stability and long life (time of operation) would significantly improve the performance of the display. The green component is very important as the human eye perceives more towards green in the visible spectrum. Since commercially available zinc silicate based phosphors fail to satisfy all the above requirements, a new phosphor and process for synthesizing such a phosphor has been developed to overcome the above limitations. The small size phosphor particles are particularly suitable for use in applications in which a high packing density is required. The result of this development effort is the basis of the present invention.

This invention provides a method of synthesizing yttrium borate and yttrium, gadolinium borate phosphors incorporating high concentrations of activator ion ($Tb^{3+}$) and optionally, sensitizer ion ($Ce^{3+}$). The formation of a yttrium or yttrium, gadolinium solid solution which is critical, depends mainly on the reaction temperature and conditions. In a solid state reaction, respective oxides, nitrides or hydroxides are reacted at higher temperatures in the presence of excess boric acid. At these high temperatures, other phases can form, such as individual borate's and unreacted oxides, nitrides or hydroxides of yttrium, gadolinium, etc. Proper doping of impurity ions into the lattice of the complex is less certain at higher temperatures. Also, the high temperature process leads to growth of larger particles.

The sol-gel and solution processes of the present invention can be divided into two categories: (1) aqueous-based processes that starts from a solution of a metal salt and (2) alcohol-based processes that starts from a metal alkoxide. Selection of the most suitable process will be based primarily on the cost and availability of the starting chemicals. Since the purity of the starting chemicals is very important to the synthesis of phosphors, the starting chemicals are of 99.99 to 99.9999% purity. Because metal alkoxides are expensive, nitrates of yttrium, gadolinium, terbium and cerium are particularly suitable metal sources and trimethyl borate is a particularly suitable source of boron.

Initially, a trimethyl borate stock solution is prepared by mixing trimethyl borate and ethanol in a ratio of about 1:10. To better understand these materials, a number of phosphors are prepared at different conditions. Metal precursors are synthesized by adopting the following routes:

By using ion exchange resin, stable sol-gels are prepared. Yttrium nitrates of (99.9999% purity) are dissolved in deionized (DI) water to obtain a clear 0.01M solution. This solution is then passed through an ion $(OH)^-$ exchange column with Dowex 1X4 (50–100 mesh) resin at room temperature. The flow of the solution is controlled to maintain the pH of the collected solution at about 11.0. Since the resultant solution contains only a small quantity of yttrium it is preferable to increase the concentration of nitrates up to about 0.1M. A yttrium hydroxide sol collected at the bottom of the resin column is clear but becomes opalescent with an increase in yttrium concentration, as well as upon storage. Sols prepared at lower yytrium concentrations remain stable for months. Sols of other metal (Gd, Tb and Ce) hydroxides were prepared similarly.

The required metal solutions can also be prepared by mixing appropriate amounts of respective metal nitrates in luke warm DI water to obtain 0.05 to 0.1 M solutions. Stoichiometric quantities of metal (Y, Gd, Tb and Ce) solutions and trimethyl borate are added together so that the metal to borate ratio is maintained in the range of about 0.95 to 1.05. The metal/borate solution is transferred to a round bottom flask provided with a stirrer mantle and peptized at 80 to 100° C. for 9 to 18 hours.

Gelation can be carried out with acid catalyzed sols (pH=1.0 to 2.0) or base catalyzed sols (pH=8.0 to 9.0). For low pH sols, pepitization requires a critical amount of certain acids to be introduced into the solution. Acid additions are generally specified in terms of acid type and pH. In the present invention, boric acid has been found to be an appropriate acid as it acts as an acid catalyzer and compensates for the loss of boron during calcination.

After pepitization, sol/gels are left in a container until they thicken (3 to 5 days). The thickened gels are then dried in a lab oven at 60 to 70° C. to form xerogels. These xerogels are transferred into a high grade alumina crucible and subjected to two heat cycles. In the first heat cycle, the sample is soaked for 2 hours at 300° C. and then heated to 800 to 1000° C. for 2 to 12 hours. After cooling to room temperature, the mass is crushed gently (e.g., in a mortar and pestal). The crushed powder is then washed with deionized water and dried at 100° C. for 4 to 6 hours.

Figure 1:
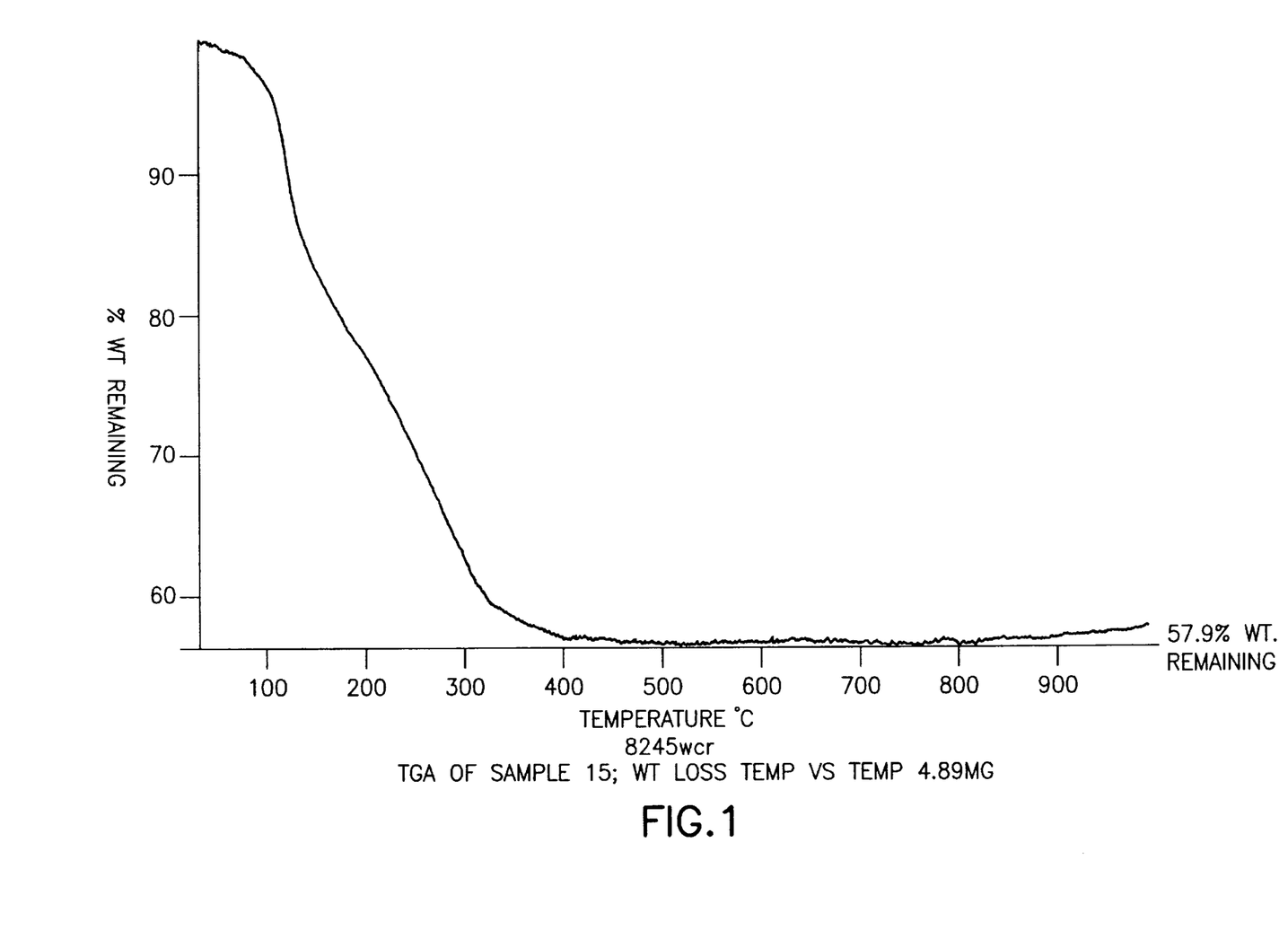
FIG. 1 provides a Thermo-Gravimetric Analysis (TGA) of rare earth (RE) borate xerogel powder.

Thermal analysis of phosphor samples containing various proportions of metal provides insight into the reaction kinetics. The thermal analysis data on one of these samples is presented in FIG. 1. The data reveals that the samples have undergone two to three successive weight changes in three different temperature regions. The first weight change occurs around 100° C. and corresponds to the loss of free water molecules associated with the respective metal salt solutions. The second weight loss occurs around 200 to 300° C. and is due to the loss of —CH$_3$O through oxidation.

Figure 2A:
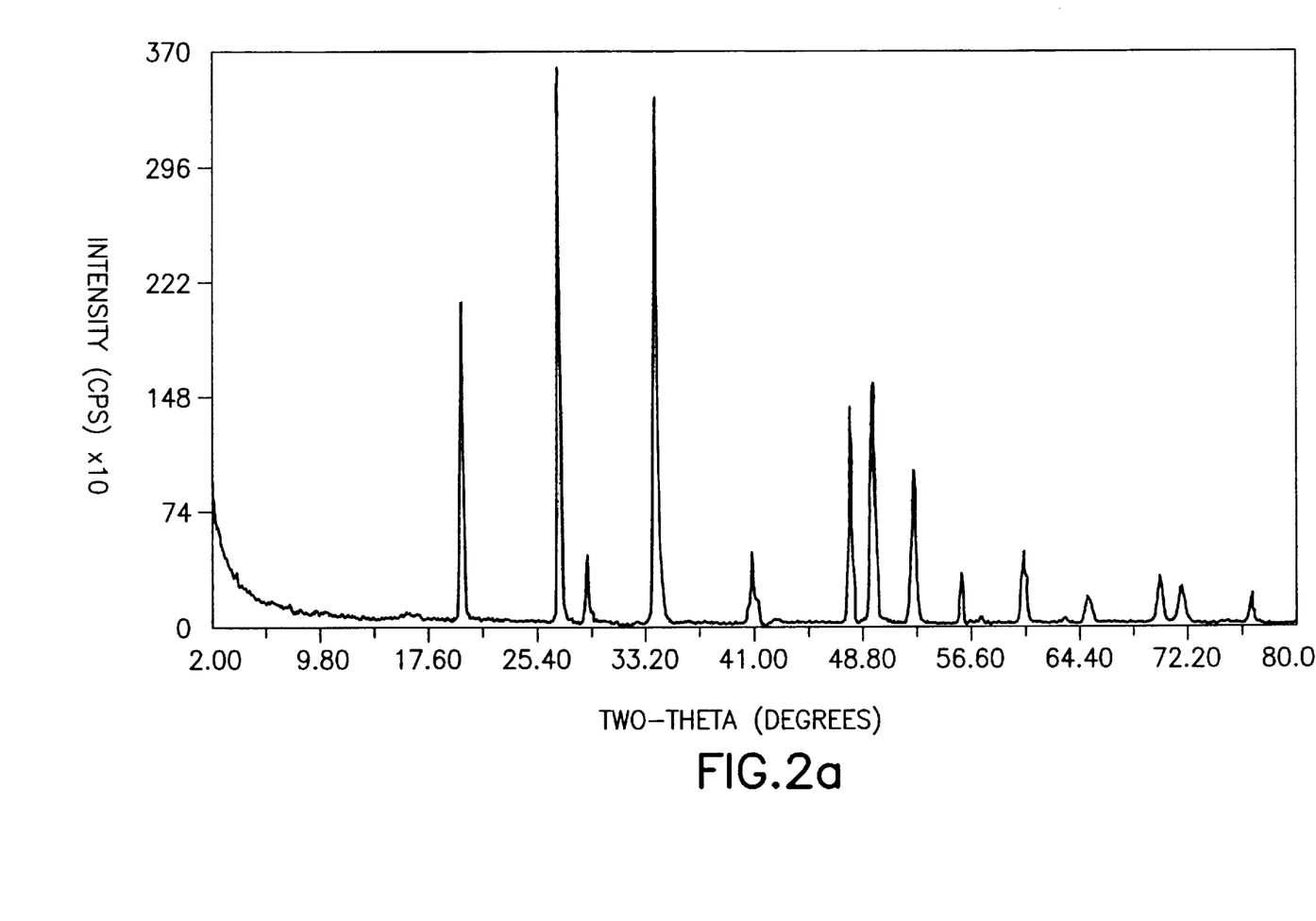
Figure 2B:
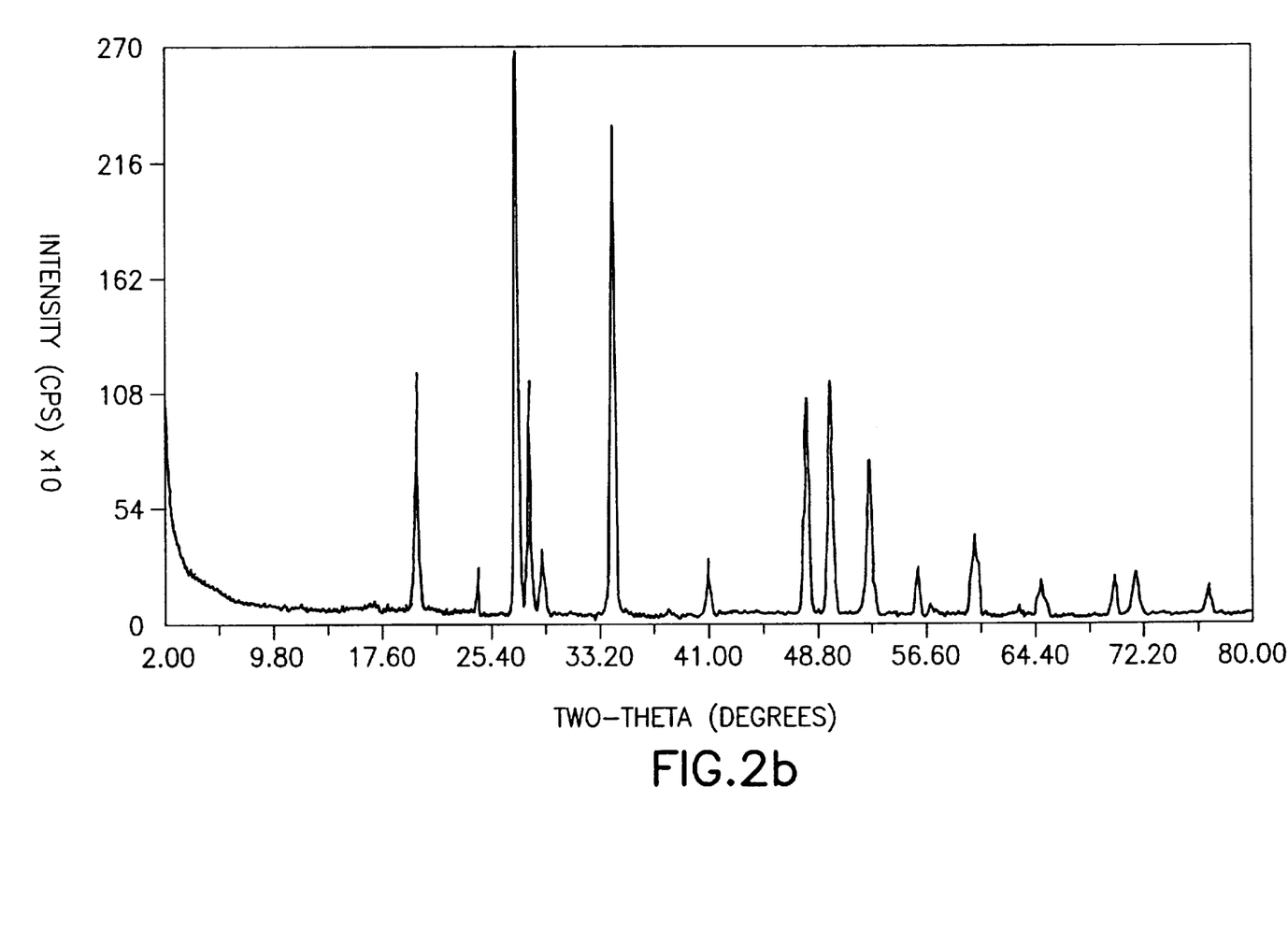
Figure 3A:
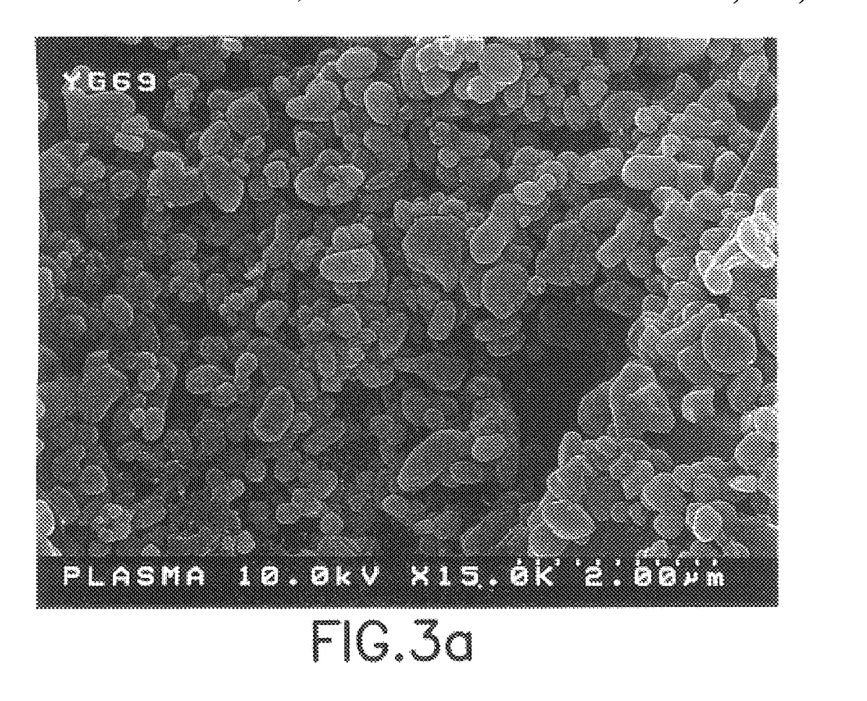
Figure 3B:
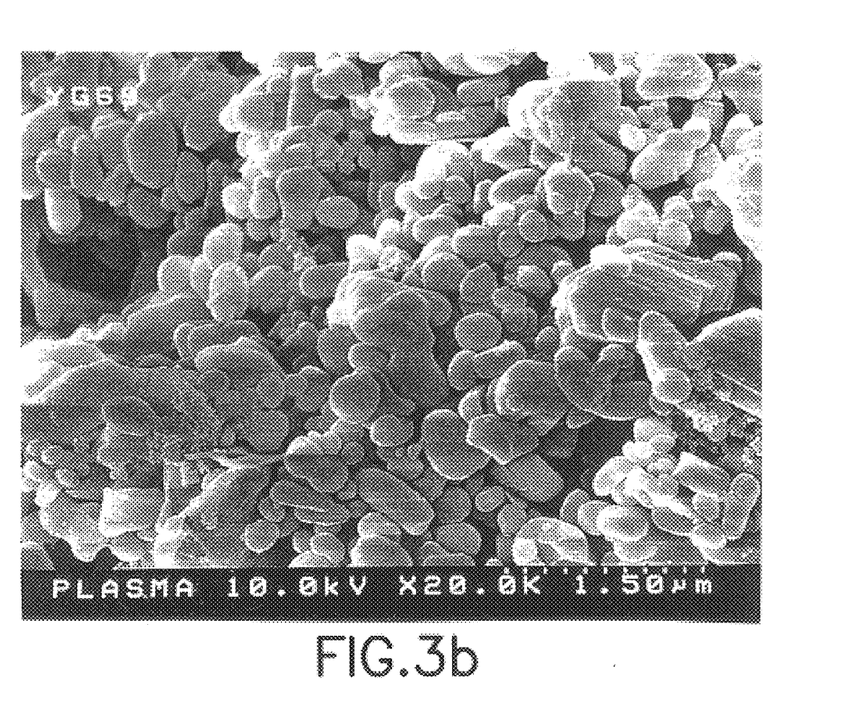
Figure 3C:
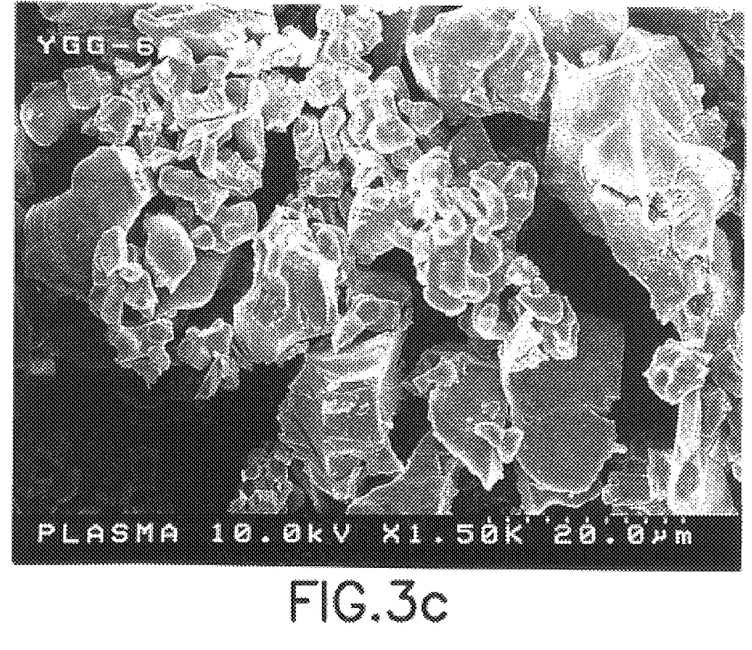
Figure 3D:
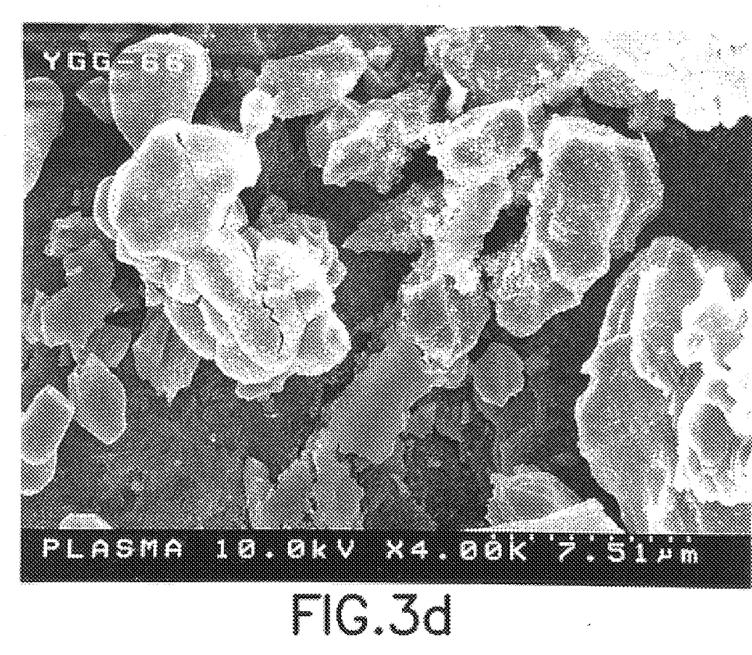

X-ray powder diffraction data on samples fired at 950° C. are shown in FIG. 2. Samples fired at 800° C. show some the lines corresponding to a yttrium, gadolinium borate phase. Since there is no standard data on these new materials, XRD lines are compared with the data of starting materials as well as possible compositions, such as nitrates and oxides of respective metals. All the prominent lines corresponding to yttrium, gadolinium borate phase are observed in samples fired above 850° C. This indicates that the samples are completely converted to borate as no lines corresponding to any of the metal nitrates or oxides are observed. This conclusion is also supported by TGA data. The lines corresponding to metal borate phase become more prominent with increased firing temperatures.

Figure 4A:
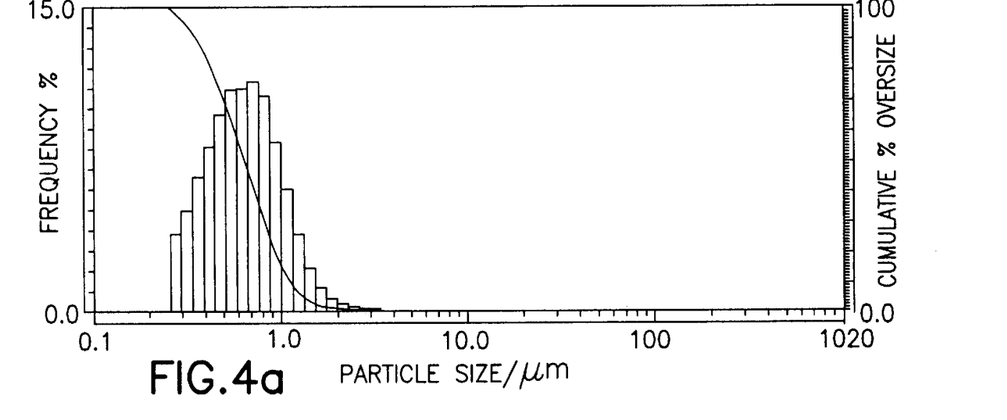
Figure 4B:
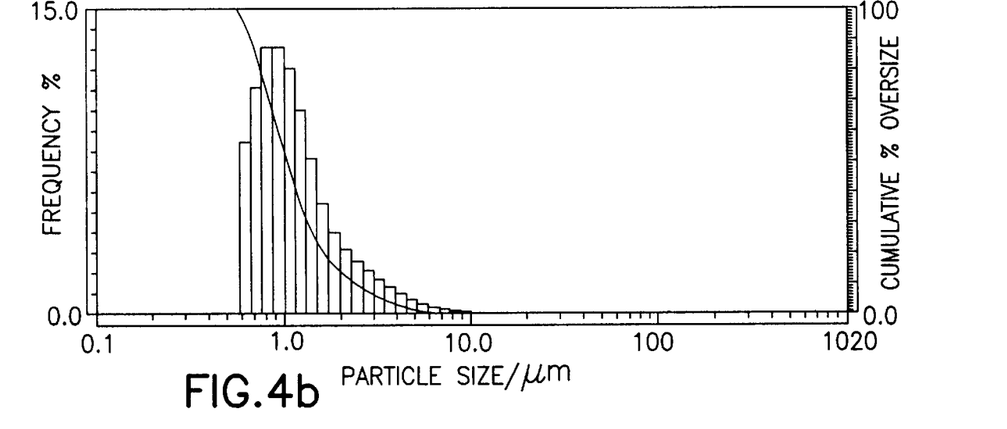
Figure 4C:
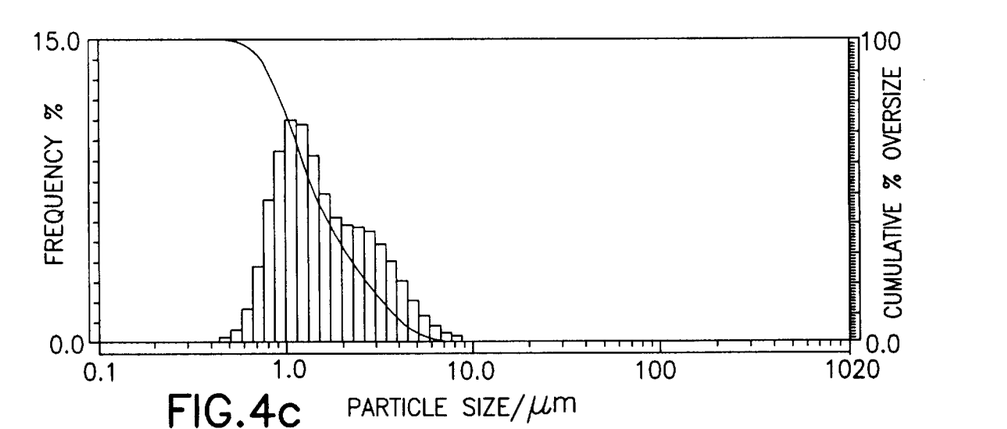

Since the luminescence of a phosphor depends on each of the shape, size, crystallinity, defects, grain boundaries, the morphology and PSD of samples prepared under various conditions were studied. Scanning electron micrographs of phosphor samples prepared under various conditions are shown in FIG. 3. From the micrographs one can observe that the phosphor particles are uniform and exhibit spherical shapes. The PSD of phosphors prepared at different temperatures are shown in FIG. 4. The samples are washed with water after calicination to eliminate very small particles (<0.05 microns) as well as organic residues and allowed to dry prior to determination of PSD. The emission characteristics of these phosphors are carried out on powders at room temperature.

Figure 5A:
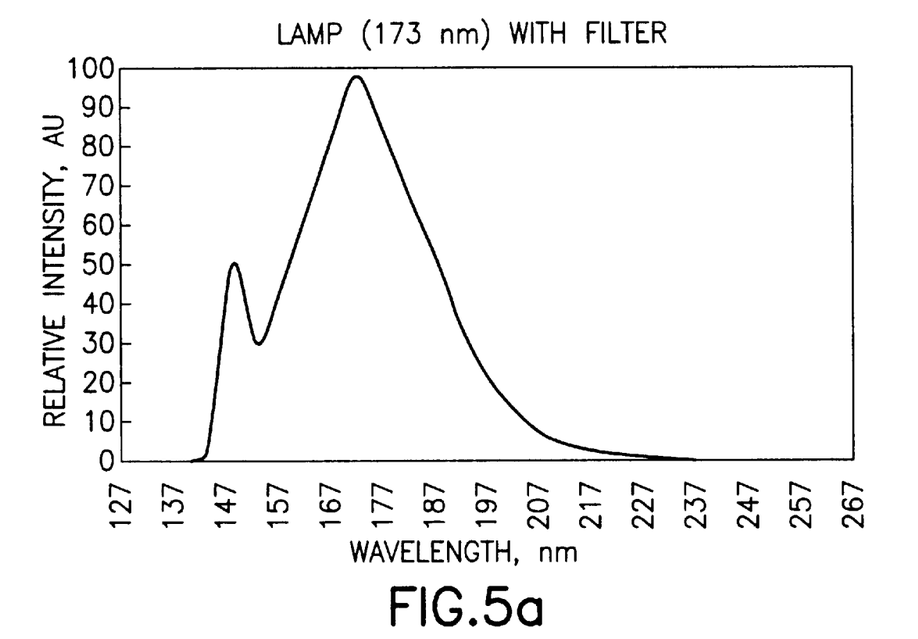
Figure 5B:
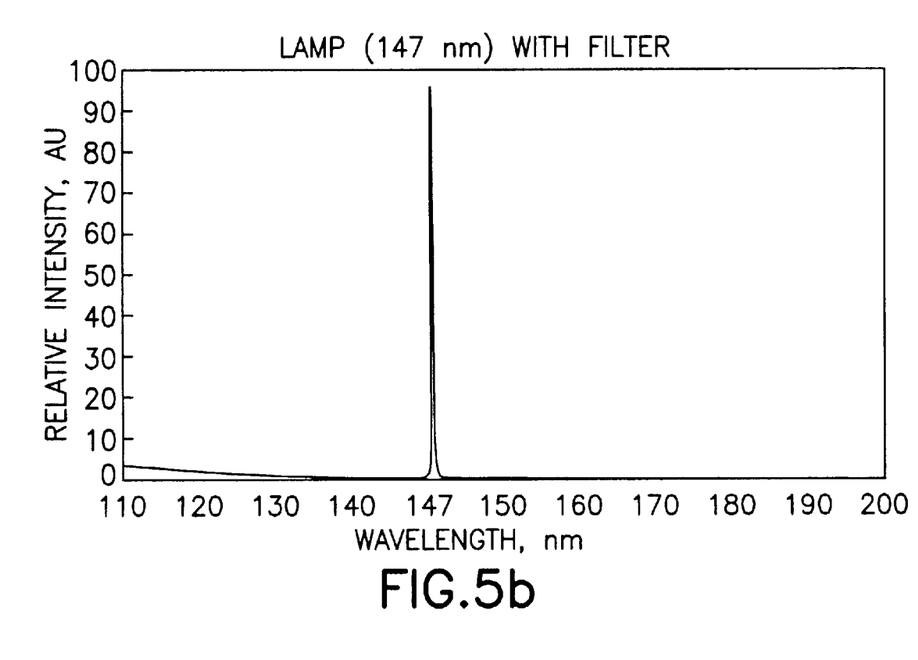
Figure 6A:
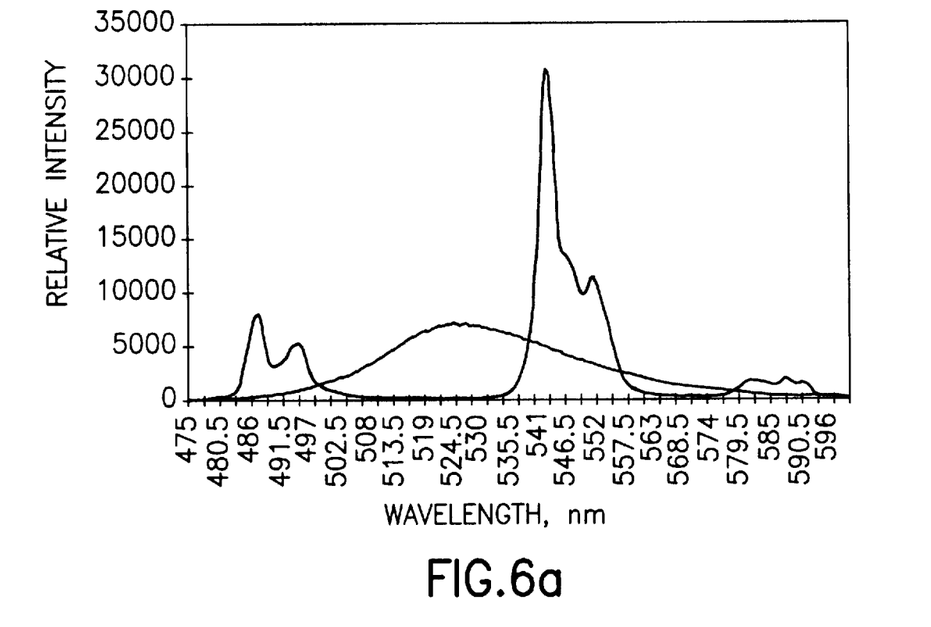
Figure 6B:
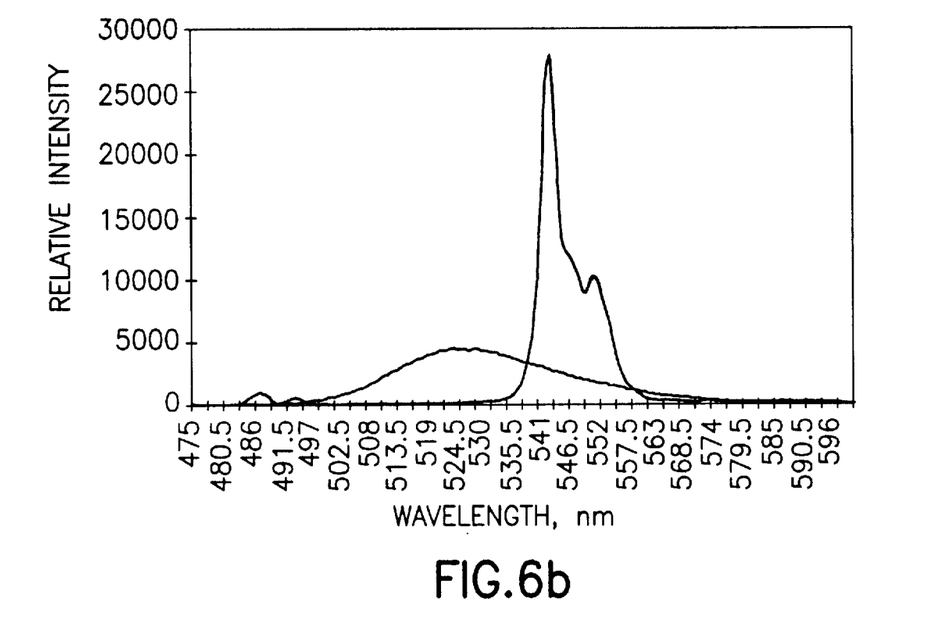
Figure 7A:
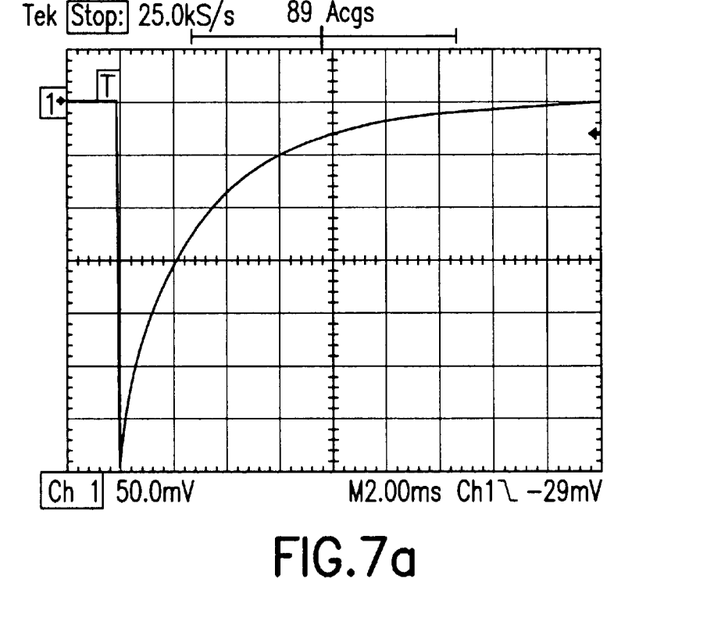
Figure 7B:
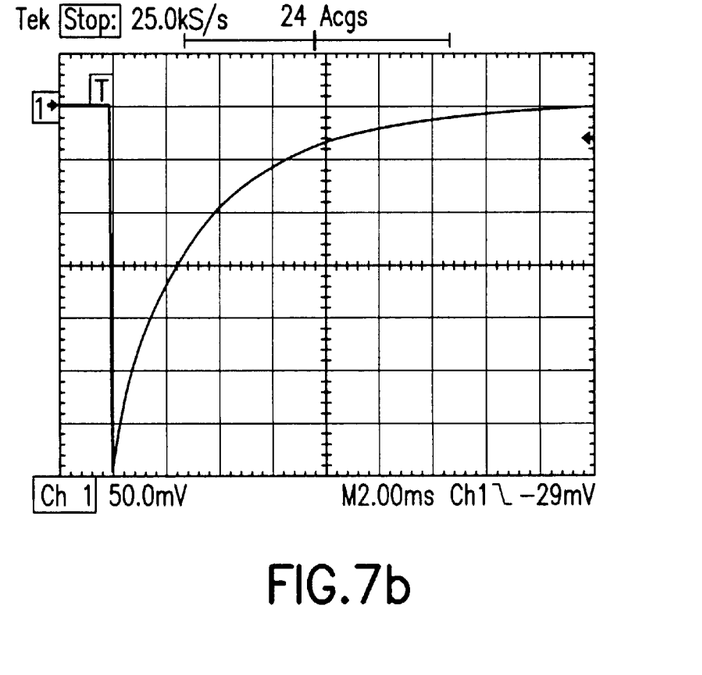

FIG. 5 represents the spectral distribution of radiation energy from different custom made 147 and 173 nm Xenon lamps provided with a MgF$_2$ windows and suitable band pass filters. The emission spectra of Tb and Ce doped yttrium, gadolinium borate phosphors prepared from metal nitrates and the emission spectrum of a commercially available Mn activated ZnSiO$_4$ are shown in FIG. 6. The spectral energy distribution of Tb emission strongly depends on Tb concentration. At lower concentrations of Tb, a weak emission in the blue region is observed which corresponds to $^5D_3 \rightarrow ^7F_j$. With increases in Tb concentration, the emission in blue region decreases. The emission spectra observed in samples activated at higher Tb concentrations can be divided into six groups corresponding to $^5D_4 \rightarrow ^7F_j$ transitions where J=6 to 1. With higher Tb concentrations, the cross relaxation mechanism produced rapid population of the $^5D_4$ state at the expense of $^5D_3$ giving strong emission in the green region. The physical process of energy transfer between senstizer-S (Gd$^{3+}$ or Ce$^{3+}$) to activator-A (Tb$^{3+}$) in the present phsophor can be explained as follows:

For display applications, particularly televisions, it is preferable to have a single peak at 543 nm to obtain good color purity. By incorporating a blue absorption dye in a filter (used to eliminate unwanted colors, anti reflection, EMF, anti static, etc.), the blue peak can be eliminated completely. For lamp applications, both the peaks are quite acceptable. A particularly suitable phosphor can contain from about 32 wt. % to about 45 wt. % yttrium, from about 9 wt. % to about 18 wt. % gadolinium, from about 4 wt. % to about 8 wt. % terbium, from about 0 wt. % to 5 wt. % cerium and about 6.6 wt. % to about 7 wt. % boron, with all weights percentages being based on the total weight of the phosphor.

Further details of this invention will be described with reference in the following examples.

EXAMPLE I

The preparation of a terbium doped yttrium gadolinium borate phosphor employing the hydroxides of yttrium, gadolinium and terbium and an acid catalyzer using a sol-gel process is described in this example. The following starting materials were used. The amounts of respective hydroxide solution (semi-gels) prepared from ion exchange column and borate solutions, in terms of both volume and percentage by weight per batch, are described in Table I.

TABLE I

| Chemical | Quantity (CC) | Element (Gm) | Mol. % |
| --- | --- | --- | --- |
| Yttrium Hydroxide (0.01M) | 1640 | 1.453 | 82 |
| Gadolinium Hydroxide (0.01M) | 200 | 0.314 | 10 |
| Terbium Hydroxide (0.01M) | 160 | 0.237 | 8 |
| Trimethyl Borate (0.08M) | 200 | — | — |
| Boric Acid (0.65M) | 15 | — | — |

The above hydroxide solutions are mixed in a round bottom flask. The required quantity of trimethyl borate solution is added slowly to the hydroxide solution while stirring at 45° C. Boric acid is added drop wise after the solution attains the maximum required temperature (90–95° C.) and the mixed solution peptized at that temperature for about 9–12 hours. A water condenser column is maintained at 20° C. throughout the pepitization by use of a circulating chiller. After cooling the flask to room temperature, the solution (semi-gel) is transferred to a crystallizing dish (3L capacity) and left in an open atmosphere. After 5 to 6 days, the solution becomes a gel.

These transparent hard gels are dried at 45 to 50° C. for 12 hours in a lab oven. The dried product appears like soft glass, called xerogel. The loose mass from the glass dish is gently crushed with a glass mortar and pestle. A fine powder is collected into a crucible and fired at 300° C. for 2 hours (rate of heating is 2°/min.) and then at 900° C. for 6 hours, with the same rate of heating, in a box furnace. The sample is left in the furnace until it cools to room temperature.

A hard mass is obtained after cooling. A small quantity of water pulps the hard mass into very fine particles. These fine phosphor powders are subjected to ultrasonic agitation in water. Ultrasonic treatment helps to break the clusters into very small particles. After washing with water, these powders are dried at 100° C. for 6 hours. To recover sub-micron size particles (<0.1 micron) the phosphor solution is centrifuged. The weight percents of carbon, hydrogen and nitrogen were determined by CHN analysis and an elemental analysis was conducted using plasma emission spectroscopy. The compositional analysis of the above phosphor is shown in Table II.

TABLE II

| Element | % by wt. |
| --- | --- |
| C | 0.06 |
| H | 0.00 |

TABLE II-continued

| Element | % by wt. |
| --- | --- |
| N | 0.05 |
| $B_2O_3$ | 23.00 |
| $Gd_2O_3$ | 11.30 |
| $Tb_2O_3$ | 9.04 |
| $Y_2O_3$ | 56.55 |

The emission characteristics of these phosphors and a commercially available phosphor for PDP applications, studied separately by exciting with 147 and 173 nm excitation sources (Xe lamps), are shown in Table XI. For purposes of comparison, the average particle sizes are also provided in the table.

EXAMPLE II

The preparation of terbium doped yttrium, gadolinium borate phosphor using a solution method in accordance with the present invention and employing yttrium nitrate, gadolinium nitrate, terbium nitrate and trimethyl borate in an acid catalyzer is described in this example. Starting materials used in the present example are listed in Table III. The amounts of starting materials in terms of both grams and percentage by weight per a batch, are shown in Table III.

TABLE III

| Chemical | Quantity (CC) | Element (Gm) | Mol. % |
| --- | --- | --- | --- |
| Yttrium Nitrate (0.02M) | 1450 | 2.564 | 82 |
| Gadolinium Nitrate (0.02M) | 176 | 0.554 | 10 |
| Terbium Nitrate (0.02M) | 140 | 0.418 | 8 |
| Trimethyl Borate (0.08M) | 350 | — | — |
| Boric Acid (0.65M) | 27 | — | — |

The above nitrate solutions were mixed in a round bottom flask. The required quantity of methyl borate solution is added slowly to the nitrate solution while stirring at 45° C. The solution is peptized at 90° C. for about 12 hours. The remaining preparative procedure is the same as mentioned in Example I. The CHN analysis of the above phosphor is shown in Table IV:

TABLE IV

| Element | % by wt. |
| --- | --- |
| C | 0.12 |
| H | 0.00 |
| N | 0.26 |

The emission characteristics of these phosphors and commercially available phosphors for PDP applications, studied separately by exciting with 147 and 173 nm excitation sources (Xe lamps), are given in Table XI. For the purposes of comparison, the average particle size of each sample is also provided in the table.

EXAMPLE III

The preparation of terbium and cerium doped yttrium, gadolinium borate phosphor using a solution method in accordance with the present invention, and employing yttrium nitrate, gadolinium nitrate, terbium nitrate, cerium nitrate and trimethyl borate in an acid catalyzer is described in this example. Starting materials used in the present example are listed in Table IV. The amounts, in terms of both grams and percentage by weight per a batch, are also shown in Table IV.

TABLE IV

| Chemical | Quantity (CC) | Element (Gm) | Mol. % |
| --- | --- | --- | --- |
| Yttrium Nitrate (0.02M) | 1415 | 2.501 | 80 |
| Gadolinium Nitrate (0.02M) | 123 | 0.388 | 7 |
| Terbium Nitrate (0.02M) | 140 | 0.418 | 8 |
| Cerium Nitrate (0.02M) | 88 | 0.232 | 5 |
| Trimethyl Borate (0.08M) | 350 | — | — |
| Boric Acid (0.65M) | 27 | — | — |

The above nitrate solutions were mixed in a round bottom flask. The required quantity of methyl borate solution is added slowly to the nitrate solution while stirring at 45° C. The solution is peptized at 90° C. for about 12 hours. The remaining preparative procedure is the same as mentioned in Example I. The CHN analysis of the above phosphor is shown in Table IV:

TABLE IV

| Element | % by wt. |
| --- | --- |
| C | 0.03 |
| H | 0.00 |
| N | 0.02 |

The emission characteristics of these phosphors and commercially available phosphors for PDP applications, studied separately by exciting with 147 and 173 nm excitation sources (Xe lamps), are provided in Table XI. For the purpose of comparison, the average particle size of each sample is also noted in the table.

EXAMPLE IV

The preparation of terbium and cerium doped yttrium, gadolinium borate phosphor using a solid state reaction in accordance with the present invention, and employing yttrium oxide, gadolinium oxide, terbium oxide, cerium oxide and boric acid is described in this example. Starting materials used in the present example are listed in Table VII. The amounts, in terms of both grams and percentage by weight per batch, are also shown in Table VII.

TABLE VII

| Chemical | Quantity (Gm) | Element (Gm) | Mol. % |
| --- | --- | --- | --- |
| Yttrium Oxide | 7.000 | 5.511 | 85 |
| Gadolinium Oxide | 1.322 | 1.146 | 10 |
| Terbium Nitrate | 0.628 | 0.579 | 5 |
| Boric Acid | 3.00 | — | — |

The above oxides are mixed and ground with an alumina mortar and a pestle. The resultant mixture is fired at a high temperature. The remaining preparative procedure is the same as mentioned in Example I. The CHN analysis of the above phosphor is shown in Table VIII:

TABLE VIII

| Element | % by wt. |
|---|---|
| C | 0.03 |
| H | 0.00 |
| N | 0.01 |

The emission characteristics of these phosphors and commercially available phosphors for PDP applications, studied separately by exciting with 147 and 173 nm excitation sources (Xe lamps), are given in Table IX. For comparison, average particle size for each sample is also noted in the table.

TABLE IX

| Phosphor | Relative Intensity @ Excitation | | Relative Integrated Area | | Persistence (10%) | Color Coordinates | | | | Particle Size |
| | 147 nm | 173 nm | W/O F | W/F | (ms) | W/Filter | | W/O Filter | | (μm) |
| | | | | | | x | y | x | y | |
|---|---|---|---|---|---|---|---|---|---|---|
| Phosphor 1 | 78 | 72 | | | 8 | 0.279 | .707 | .282 | .633 | 0.1–2 |
| Phosphor 2 | 100 | 100 | 130 | 111 | 8 | 0.279 | .709 | .282 | .633 | 1.0–4 |
| Phosphor 3 | 83 | 75 | | | 7 | 0.281 | .704 | .292 | .594 | 1.0–4 |
| Phosphor 4 | 66 | 53 | | | 10 | 0.283 | .699 | .284 | .630 | 2.0–6 |
| Com. 1 | 21 | 38 | 100 | 100 | 14 | 0.226 | .709 | .258 | .697 | 3.0–8 |

Phosphors 1 through. 4 are materials formed in accordance with the above Examples 1 through 4, respectively, and are representative of the present invention. Commercial 1 is the best commercially available Mn activated zinc silicate phosphor for plasma displays. Relative intensities are measured at maximum peak (borate at 543.5 nm and silicate at 530 nm).

As the data. of Table IX demonstrate, the phosphors of Example 1 through 4, formed by the sol/gel, sol/sol and solid state reaction processes of the present invention, provide various particle size ranges, while also generally providing a higher level of brightness, shorter persistence and longer life time.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method of forming a phosphor having the empirical formula:

$(Y_{1-x-y-z}Gd_xTb_yCe_z)BO_3$ wherein: 0.0<x<0.2; 0.01<y<0.1; and 0.0<z<0.1; said method comprising the steps of:
reacting a dilute acidic solution comprising sources of the elemental rare earth components and an organic precursor providing a source of boron to form a gel;
drying said gel to a xerogel; and
thermally decomposing said xerogel at a temperature below a solid state reaction temperature to obtain said phosphor.

2. The method of claim 1, wherein sources of said elemental rare earth components are independently selected from the group consisting of respective salts; and said organic precursor providing a source of boron further comprises boric acid.

3. The method of claim 1, wherein said sources of said elemental rare earth components are respective nitrates.

4. The method of claim 1, wherein said sources of said elemental rare earth components are respective hydroxides.

5. The method of claim 1, wherein said terbium activates said phosphor.

6. The method of claim 1, wherein said gel is thermally decomposed in an open atmosphere, at a temperature in a range of about 800 to 1000° C. for about 2 to 12 hours.

7. The method of claim 1, wherein said gel is dried to form a xerogel and said xerogel is crushed to form a powder prior to thermal decomposition.

8. The method of claim 1, wherein said phosphor has particles with a particle size in the range of about 0.1 to about 2.0 microns.

9. The method of claim 1, wherein said phosphor comprises from about 32 wt. % to about 45 wt. % yttrium, from about 9 wt. % to about 18 wt. % gadolinium, from about 4 wt. % to about 8 wt. % terbium, from about 0 wt. % to 5 wt. % cerium and about 6.6 wt. % to about 7 wt. % boron.

10. A phosphor having the empirical formula:

$(Y_{1-x-y-z}Gd_xTb_yCe_z)BO_3$ wherein: 0.0<x<0.2; 0.01<y<0.1; and 0.0<z<0.1, said phosphor having substantially spherical particles with a particle size in the range of 0.1 to 2.0 microns, said phosphor formed by a process comprising the steps of:
reacting a dilute acidic solution comprising sources of the elemental rare earth components and an organic precursor providing a source of boron to form a gel;
drying said gel to a xerogel; and
thermally decomposing said gel at a temperature below a solid state reaction temperature to obtain said phosphor.

11. The phosphor of claim 10, wherein said sources of said elemental rare earth components are independently selected from the group consisting of respective salts; and said organic precursor providing a source of boron further comprises boric acid.

12. The phosphor of claim 11, wherein said sources of said elemental rare earth components are respective nitrates.

13. The phosphor of claim 11, wherein said sources of said elemental rare earth components are respective hydroxides.

14. The phosphor of claim 10, wherein said xerogel is thermally decomposed in an open atmosphere, at a temperature in a range of about 800 to 1000° C. for about 2 to 12 hours.

15. The phosphor of claim 10, wherein said phosphor comprises from about 32 wt. % to about 45 wt. % yttrium, from about 9 wt. % to about 18 wt. % gadolinium, from about 4 wt. % to about 8 wt. % terbium, from about 0 wt. % to 5 wt. % cerium and about 6.6 wt. % to about 7 wt. % boron.

16. A method of forming a phosphor having the empirical formula:

$$(Y_{1-x-y-z}Gd_xTb_yCe_z)BO_3$$

wherein: $0.0<x<0.2$; $0.01<y<0.1$; and $0.0<z<0.1$; said method comprising the step of:

mixing powdered source of the elemental rare earth components and an organic precursor providing a source of boron to form a mixed powder; and firing said mixed powder at a temperature equal to or greater than a solid state reaction temperature to obtain said phosphor; and wherein said sources of said elemental rare earth components are selected from the group consisting of respective nitrates and hydroxides thereof.

* * * * *